United States Patent
Yanson et al.

(10) Patent No.: US 9,695,521 B2
(45) Date of Patent: Jul. 4, 2017

(54) PROCESS TO PREPARE METAL NANOPARTICLES OR METAL OXIDE NANOPARTICLES

(75) Inventors: Alexei Yanson, Leiden (NL); Marcus Koper, Leiderdorp (NL); Paramaconi Rodriguez, Birmingham (GB); Nuria Garcia-Araez, Southampton (GB)

(73) Assignee: UNIVERSITEIT LEIDEN, Leiden (NL)

( * ) Notice: Subject to any disclaimer, the term of this patent is extended or adjusted under 35 U.S.C. 154(b) by 983 days.

(21) Appl. No.: 13/810,804

(22) PCT Filed: Jul. 14, 2011

(86) PCT No.: PCT/EP2011/062101
§ 371 (c)(1),
(2), (4) Date: Mar. 28, 2013

(87) PCT Pub. No.: WO2012/010501
PCT Pub. Date: Jan. 26, 2012

(65) Prior Publication Data
US 2013/0199673 A1 Aug. 8, 2013

(30) Foreign Application Priority Data
Jul. 19, 2010 (NL) .................... 2005112

(51) Int. Cl.
*C25D 1/00* (2006.01)
*B01J 23/40* (2006.01)
(Continued)

(52) U.S. Cl.
CPC ........... *C25D 1/006* (2013.01); *B01J 23/40* (2013.01); *B01J 23/462* (2013.01); *B01J 23/464* (2013.01);
(Continued)

(58) Field of Classification Search
CPC .......... C25D 1/00; B01J 23/40; B23K 35/025
See application file for complete search history.

(56) References Cited

U.S. PATENT DOCUMENTS

| 1,440,502 A | 1/1923 | Slepian |
| 2,216,167 A | 10/1940 | Fisher |

(Continued)

FOREIGN PATENT DOCUMENTS

| CN | 1375377 A | 10/2002 |
| CN | 1562555 A | 1/2005 |

(Continued)

OTHER PUBLICATIONS

Marin et al., "An Electrochemistry Experiment: Hydrogen Evolution Reaction on Different Electrodes" Journal of Chemical Education, vol. 71 No. 11 Nov. 1994, pp. A277-A278.*

(Continued)

*Primary Examiner* — Jessee Roe
*Assistant Examiner* — Christopher Kessler
(74) *Attorney, Agent, or Firm* — Nixon Peabody LLP

(57) ABSTRACT

The invention is directed to a process to prepare metal nanoparticles or metal oxide nanoparticles by applying a cathodic potential as an alternating current (ac) voltage to a solid starting metal object which solid metal object is in contact with a liquid electrolyte comprising a stabilizing cation. The invention is also directed to the use of the nanoparticles as a catalyst.

9 Claims, 8 Drawing Sheets

(51) Int. Cl.

| | | |
|---|---|---|
| *B01J 23/46* | (2006.01) | |
| *B01J 23/89* | (2006.01) | |
| *B01J 35/00* | (2006.01) | |
| *B01J 37/34* | (2006.01) | |
| *B23K 35/02* | (2006.01) | |
| *B23K 35/26* | (2006.01) | |
| *B82Y 30/00* | (2011.01) | |
| *B82Y 40/00* | (2011.01) | |
| *C02F 1/72* | (2006.01) | |
| *C09D 11/52* | (2014.01) | |
| *C25C 5/00* | (2006.01) | |
| *C25C 5/02* | (2006.01) | |
| *B01D 53/94* | (2006.01) | |

(52) U.S. Cl.
CPC ............ *B01J 23/468* (2013.01); *B01J 23/89* (2013.01); *B01J 35/00* (2013.01); *B01J 35/006* (2013.01); *B01J 35/0013* (2013.01); *B01J 37/348* (2013.01); *B23K 35/025* (2013.01); *B23K 35/262* (2013.01); *B82Y 30/00* (2013.01); *B82Y 40/00* (2013.01); *C02F 1/725* (2013.01); *C09D 11/52* (2013.01); *C25C 5/00* (2013.01); *C25C 5/02* (2013.01); *B01D 53/94* (2013.01); *B22F 2998/00* (2013.01); *Y02W 10/37* (2015.05)

(56) References Cited

U.S. PATENT DOCUMENTS

| | | |
|---|---|---|
| 2,786,808 A | 3/1957 | Raney |
| 2002/0037320 A1 | 3/2002 | Denes et al. |
| 2003/0207112 A1 | 11/2003 | Yadav |
| 2005/0072679 A1 | 4/2005 | Nayfeh et al. |
| 2005/0230042 A1 | 10/2005 | Hashimoto |
| 2006/0249231 A1 | 11/2006 | Bezerra et al. |
| 2007/0152016 A1 | 7/2007 | Choe et al. |
| 2007/0193026 A1 | 8/2007 | Dong et al. |
| 2008/0251390 A1 | 10/2008 | Tsai et al. |
| 2009/0218234 A1 | 9/2009 | Jayaraman |
| 2009/0301606 A1 | 12/2009 | Ueshima |
| 2009/0325795 A1 | 12/2009 | Kamizono et al. |
| 2010/0031848 A1 | 2/2010 | Lee et al. |
| 2010/0072434 A1 | 3/2010 | Lee et al. |
| 2011/0068013 A1* | 3/2011 | Choi ............... B22F 1/0018 205/341 |
| 2013/0199673 A1 | 8/2013 | Yanson et al. |

FOREIGN PATENT DOCUMENTS

| | | | |
|---|---|---|---|
| CN | 1586790 A | 3/2005 | |
| CN | 1853843 A | 11/2006 | |
| CN | 1870310 | 11/2006 | |
| CN | 101054711 A | 10/2007 | |
| CN | 101208173 A | 6/2008 | |
| CN | 101215019 | 7/2008 | |
| CN | 101362259 | 2/2009 | |
| CN | 101823187 A | 9/2010 | |
| DE | 10245509 | 6/2004 | |
| DE | 102005044873 | 3/2007 | |
| DE | 202009000758 | 4/2009 | |
| DE | 102008037263 A1 | 2/2010 | |
| JP | 04-157193 A | 5/1992 | |
| JP | 2007044754 A | 2/2007 | |
| JP | 2007297671 A | 11/2007 | |
| JP | 2009006337 A | 1/2009 | |
| JP | 2009046372 | 3/2009 | |
| JP | 2010227963 A | 10/2010 | |
| JP | 2011041955 A | 3/2011 | |
| JP | 2011054892 A | 3/2011 | |
| JP | 2011058041 A | 3/2011 | |
| JP | 2011077225 A | 4/2011 | |
| JP | 2011104649 A | 6/2011 | |
| KR | 20020061584 A | 7/2002 | |
| KR | 20050072062 A | 7/2005 | |
| KR | WO 2006126808 A1 * | 11/2006 | ............... B22F 9/24 |
| KR | WO 2008111735 A1 * | 9/2008 | .......... B01J 13/0034 |
| KR | 20090032234 A | 4/2009 | |
| NL | 2005112 C | 1/2012 | |
| TW | 200533457 A | 10/2005 | |
| TW | 201034784 A | 10/2010 | |
| WO | 2004/026526 A1 | 4/2004 | |
| WO | 2004/112997 A1 | 12/2004 | |
| WO | 2006/126564 A1 | 11/2006 | |
| WO | 2007/014648 A1 | 2/2007 | |
| WO | 2007055663 A1 | 5/2007 | |
| WO | 2008101602 A2 | 8/2008 | |
| WO | 20111007402 A1 | 1/2011 | |
| WO | 20111007608 A1 | 1/2011 | |

OTHER PUBLICATIONS

Liu et al., "New pathway for the synthesis of ultrafine silver nanoparticles from bulk silver substrates in aqueous solutions by sonoelectrochemical methods" Electrochemistry Communications vol. 6, Issue 11, Nov. 2004, pp. 1163-1168.*
Khaydarov et al., "Electrochemical method for the synthesis of silver nanoparticles" Journal of Nanoparticle Research Jul. 2009, vol. 11, Issue 5, pp. 1193-1200.*
Ahn et al., "Electrochemical capacitors based on electrodeposited ruthenium oxide on nanofibre substrates", Nanotechnology, 17:2865-2869 (2006).
Arikawa et al., "Simultaneous determination of chlorine and oxygen evolving at $RuO_2/Ti$ and $RuO_2$—$TiO_2/Ti$ anodes by differential electrochemical mass spectroscopy", Journal of Applied Electrochemistry, 28:511-516 (1998).
Chen et al., "Facile preparation of Bi nanoparticles by novel cathodic dispersion of bulk bismuth electrodes", Electrochimica Acta, 54:7370-7373 (2009).
Huang et al., "Simultaneous Fabrications of Nanoparticles and 3D Porous Films of Sn or Pb from Pure Electrodes", Electrochemical and Solid-State Letters, 13(5):K46-K48 (2010).
Jiang et al., "Synthesis and Thermal and Wetting Properties of Tin/Silver Alloy Nanoparticles for Low Melting Point Lead-Free Solders", Chemistry of Materials, vol. 19:4482-4485 (2007).
Liu et al., "Facile Electrochemical Dispersion of Bulk Rh into Hydrosols", International Journal of Electrochemical Science, 4:1302-1308 (2009).
Rodriguez et al., "Specific surface reactions for identification of platinum surface domains. Surface characterization and electrocatalytic tests", Electrochim. Acta, 50:4308-4317 (2005).
Haber, "The phenomenon of the formation of metallic dust from cathodes" Trans. Am. Electrochem. Soc. 2:189-196 (1902).
Tian et al., "Synthesis of tetrahexahedral platinum nanocrystals with high-index facets and high electro-oxidation activity" Science 316(5825):732-735 (2007).
Yanson et al., "Cathodic corrosion: a quick, clean, and versatile method for the synthesis of metallic nanoparticles" Angewandte Chemie International Edition 50(28):6346-6350 (2011).
NL 2005112 Document; Agentschap NL; dated Mar. 8, 2011.
Zou et al., Journal of Electronic Materials, 38(2):351-355 (2009). "Nanoparticles of the Lead-free Solder Alloy Sn-3.0Ag-0.5Cu with Large Melting Temperature Depression.".

* cited by examiner

US 9,695,521 B2

PROCESS TO PREPARE METAL NANOPARTICLES OR METAL OXIDE NANOPARTICLES

CROSS REFERENCES TO RELATED APPLICATION

This application is a 35 U.S.C. §371 National Phase Entry Application of International Application No. PCT/EP2011/062101 filed Jul. 14, 2011, which designates the U.S., and which claims benefit under 35 U.S.C. §119(b) of Netherlands Application 2005112 filed Jul. 19, 2010, the contents of which are herein incorporated by reference in their entirety.

BACKGROUND OF THE INVENTION

The invention is directed to a process to prepare metal nanoparticles or metal oxide nanoparticles.

US-A-2010/0072434 describes a process to prepare gold nanoparticles by first preparing a polymer surfactant in an alcohol solvent and heated to its boiling point. To the boiling mixture a metal seed, i.e. chloroplatanic acid is added and subsequently HAuCl4 salt is added after which gold nano particles form around the seed.

WO-A-2007/055663 describes a process to prepare a metal nano particle wherein a metal precursor compound is contacted with a reducing agent and a capping agent to generate a reaction mixture. Exemplified metal precursor is $HAuCl_4$, exemplified reducing agent is $NaBH_4$ and the exemplified capping agent is amino acid. To this mixture sonication is applied to generate a plurality of metal colloidal particles and depositing the metal particles on a support, i.e. $TiO_2$, to prepare a catalyst.

US-A-2009/0325795 describes a process to prepare platinum nanoparticles wherein first a chemical compound like potassium tetrachloroplatinate is prepared. To this compound potassium iodide (KI) is added and subsequently the mixture is reduced to form the platinum nanoparticles.

At the heart of all known methods developed to make nanoparticles lies the reduction reaction of metal cations. The art is to limit the number of reduced cations per nanoparticle and keep its size as constant as possible, and that is invariably achieved by adding extra chemical stabilizers—most methods of nanoparticles synthesis involve micelles or colloids. These contaminate the final product and adversely affect its performance, e.g. in catalysis or biological applications. In addition, the prior art processes have the problem that they involve multiple chemical synthesis steps. Furthermore these processes require additional chemicals to act as for example reducing agent, capping agent, polymer and/or a surfactant.

In a paper titled 'The Phenomenon of the Formation of Metallic Dust from Cathodes' as read by Prof. Dr. Fritz Haber at the Second Meeting of the American Electrochemical Society on Sep. 17, 1902 an experiment was described wherein black clouds form around a lead cathode when the direct current density is increased. The same is observed for tin, bismuth, thallium, arsenic, antimony and mercury. The same paper mentions that in an acid solution a platinum wire cathode becomes black and spongy. Starting with the same platinum cathode in an alkaline solution only a slightly roughened surface was observed.

US-A-2009/0218234 describes a process to prepare titania nanowires by applying an electrical potential between an anode and a cathode as part of an electrolytic cell. The surfaces of both anode and cathode comprise a titanium surface.

BRIEF DESCRIPTION OF THE DRAWINGS

FIG. 7A shows blank voltammogram recorded in 0.5 M H2SO4 at a scan rate of 50 mV/s (solid line for platinum nanoparticles; dashed line for commercial nanoparticles). FIG. 7B shows the results of electrooxidation of CO measured after adsorption of CO at E=0.1 V vs. RHE (RHE=Reversible Hydrogen Electrode) for 1 minute and consequent purging with of the CO dissolved in solution for 30 minutes. The CO electrooxidation was recorded with a scan rate of 20 mV/s (solid line for platinum nanoparticles; dashed line for commercial nanoparticles). FIG. 7C shows results of catalysis for methanol oxidation which was measured in a 0.5 M H2SO4+0.5 M CH3OH solution at a scan rate of 50 mV/s (solid line for platinum nanoparticles; dashed line for commercial nanoparticles).

DETAILED DESCRIPTION OF THE INVENTION

Figure 1:
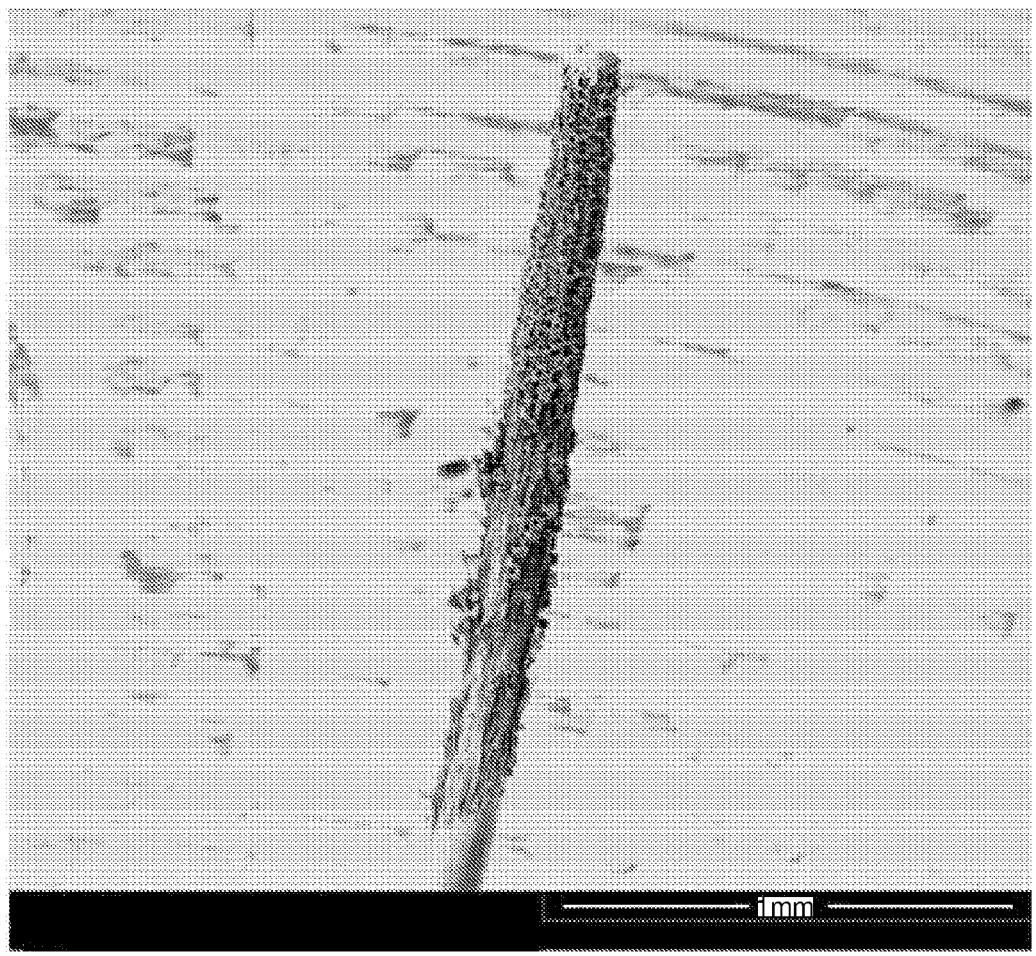
FIG. 1 is a SEM image of formation of nanoparticles having a size of <50 nm which were coated on the surface of the platinum wire (bar=1 mm scale).

The object of the present invention is to provide a more simple process to prepare nanoparticles or metal oxide nanoparticles.

This object is achieved by the following process. Process to prepare metal nanoparticles or metal oxide nanoparticles by applying a cathodic potential as an alternating current (ac) voltage to a solid starting metal object which solid metal object is in contact with a liquid electrolyte comprising a stabilising cation.

Applicants found that metal nanoparticles and metal oxide nanoparticles can be obtained in less process steps than the prior art methods while requiring less additional chemical compounds. For example, the liquid electrolyte comprising the stabilising cation can be reused in the process according to the invention. Because less additional chemicals are used, more pure nanoparticles are obtained. Without wishing to be bound to the following theory applicants believe that at the strongly negative electrode potentials employed during the process, highly non-equilibrium (clusters of) negative metal anions are formed, which serve as precursors for the formation of the nanostructures and nanoparticles.

The 1902 paper as described above did not suggest that nanoparticles are formed when applying the conditions of the process according to the present invention.

For the present invention the term nanoparticles will have the meaning of any particle having a smallest dimension of less than 1000 nm, preferably less than 200 nm, and more preferably less than 100 nm. The smallest dimension will be the smallest diameter of the particle. The nanoparticles as obtained by the process are obtained in a liquid as a solid/liquid suspension. The process includes processes which make particles of which more than 50 wt % are nanoparticles, more preferably of which more than 80 wt % are nanoparticles and even more specific wherein more than 95 wt % of the particles are nanoparticles as defined above.

The liquid electrolyte may be any liquid which has the ability to oxidise the above described anionic metal to its metallic state. Another feature of the electrolyte is that it has so-called mobile charges, i.e. it must have the ability to transfer a current from a cathode to an anode. Such mobile charges are suitably cations and anions. An example of an electrolyte is a molten salt of NaOH or an aqueous solution of NaCl. Preferably the electrolyte comprises water.

The electrolyte will comprise a stabilising cation. Suitable stabilising cations are those which do not or only very slightly reduce on the surface of the cathode under the conditions of the process according to the present invention. Such reduction would result in the formation of a layer of this compound on the surface of the metal object resulting in effectively terminating the formation of the metal nanoparticles. Applicants found that the stabilising cation is preferably an alkali or an alkaline earth cation. Examples of suitable cations of this type are $Na^+$, $Li^+$, $K^+$, $Cs^+$, $Mg^{2+}$, $Ca^{2+}$ and $Ba^{2+}$. Applicants further found that ammonium cation or a n-alkylammonium cation can be used as the stabilising cation (with n ranging between 1 and 4) and wherein the alkyl groups can be any alkyl group having 1 to 10 carbon atoms, more preferably wherein the alkyl group is a methyl, ethyl, n-propyl, iso-propyl, n-butyl or tert-butyl group. A suitable n-alkylammonium cation is tetra-tert-butylammonium. Applicants found that the choice for the accompanying anion is not critical. Examples of suitable anions are $Cl^-$, $SO_4^{2-}$, $HSO_4^-$, $ClO_4^-$, $F^-$, $NO_3^-$, $PO_4^{3-}$, $HPO_4^{2-}$, $H_2PO_4^-$, $BO_3^{3-}$, $HBO_3^{2-}$, $H_2BO_3^-$, and $OH^-$.

Preferred liquid electrolyte comprises a stabilising cation, water and an anion. It is found that the pH of the liquid electrolyte at the start of the process is not critical. Increasing the concentration of the stabilising cation in the electrolyte has resulted in a faster formation of the nanoparticles. A preferred electrolyte is an aqueous solution comprising an alkali or alkaline cation as the stabilising cation in a concentration between 0.1 mol/l and saturation. It must be understood that with concentration is meant the average concentration in the bulk of the solution and not any local higher or lower concentration.

The metal or metals are preferably chosen from the groups of the Periodic Table of Elements starting at 3 to and including group 15 and more preferably Groups 3 to and including group 13, wherein the groups are numbered according to the system adopted by IUPAC. Suitable metals of these groups are Y, Ti, V, Mn, Fe, Co, Ni, Cu, Zn, Zr, Nb, Mo, Ru, Rh, Ag, Ta, W, Re, Os, Ir, Pt, Au, Al, Si, Ga, Ge, As, In, Sn, Sb, Te, Tl, Pb and/or Bi and more suitably the metals as illustrated in the examples. Applicants found that when starting from Ru and applying an alternating current nanoparticles of ruthenium oxide are formed. The invention is also directed to such a process. Ruthenium oxide nanoparticles are advantageously used as part of a capacitor or as part of a catalyst in a catalytic gas phase oxidation of a hydrogen chloride.

The starting metal object may be an alloy of two or more metals or may consists substantially of one metal. By substantially pure metal is meant that the composition comprises more than 98 wt % of the metal or especially even more than 99.5 wt % of the metal. Applicants found that when starting from an alloy object nano-particles are obtained which also are alloys of two or more metals. Examples of possible alloys are PtNi, PtIr, PtRh, PtRu, PtCo, PtMo, PtAu, PtAg, PtRuMo, PtFe, AuCu, PtCu, PtOs, PtSn, PtBi, CuNi, CoNi, AgCu, AgAu and NiSn. This list may be expanded with SnAg, SnAgCu, SnCuNi, PtPd, SnBi, SnZn, SnZn—Bi, SnCoCu, SnCu, SnIn and SnSb and more suitably the alloy combinations as illustrated in the examples. It has been found possible to prepare nanoparticles starting from an alloy. Applicants thus provide a method to rapidly synthesize metal alloy nanoparticles with pre-defined composition, structure and catalytic properties. Most prior art methods of chemical synthesis of alloy and core shell nanoparticles involve (co-)reduction of metal salts within micelles or colloids. Other route is the so-called carbonyl synthesis route. While much work has been done to perfect these methods for making nanoparticles with pre-defined properties, they present inherent inconveniences. First is the inevitable presence of the organic components employed during the synthesis on the surface of the nanoparticles, which is also applicable to pure metal nanoparticles. These surfactants or capping materials contaminate the final product and adversely affect its performance, for example in catalysis or in biological applications. Gas-phase synthesis like laser vaporization of solid targets, magnetron sputtering, or ion sputtering allow making clean nanoparticles including alloys and mixtures, but the technique suffers from low yields and the relatively wide size distribution and particle agglomeration. The impregnation and incipient wetness method of supported nanoparticle synthesis often results in relatively large particles with a non-uniform composition due to support irregularities, and segregation of metals due to the differences in their reducibility.

Nano-particles comprising of a mixture of different materials may also be obtained by performing the process according to the invention wherein a metal different from the metal of the solid starting metal object is present as a cation in the solution. In this manner it is possible to make bimetallic nanoparticles of both metals, metal-on-oxide nanoparticles (when one of the two metals, i.e. Ti, makes $TiO_2$ nanoparticles), or mixed oxides nanoparticles.

Applicants further found that when the potential is applied as an alternating current (ac) voltage a suspension of nanoparticles in the liquid electrolyte is obtained. In a situation of alternating current the movement of the electric charge periodically reverses direction. It is believed that the alternating current enables the nanoparticles as formed when the metal object is in the cathodic state to leave the metal object when said object is in its anodic state. Preferred frequencies range from 1 to 10000 Hz. The preferred voltage amplitude is between 1 V and 30 V. Applicants found that the process proceeds well in this range. Higher voltages may be applied but will not substantially improve the speed of the reaction. The form of the alternating current may be any form, for example square, sinusoidal or triangular.

The required voltage is more cathodic than the so-called potentials of zero charge. In order to proceed with an acceptable speed of formation of nanoparticles, the applied voltage is more cathodic than the onset of the hydrogen evolution reaction. The optimum voltage will for example depend on the metal, the liquid electrolyte and the stabilising cation and the desired size of the nanoparticle. A suitable voltage is between 0.1 V and 30 V more cathodic than the onset of the hydrogen evolution reaction. Applicants found that the process proceeds well in this range. Higher voltages may be applied but will not substantially improve the speed of the reaction. Illustrative conditions will be provided in the examples.

The application of the alternating current (ac) voltage can be made between two metal objects with the same composition, in contact with the liquid electrolyte. This will result in that nanoparticles will be formed at both objects and eventually totally dissolve into the liquid electrolyte. Alternatively, the ac voltage can be applied between two electrodes of different composition. Both electrodes are in contact with the liquid electrolyte and at least one of the electrodes is the solid starting metal object. If both electrodes are active for the formation of nanoparticles, a mixture of two types of nanoparticles can be obtained. Alternatively, one of the electrodes may be of an inert material, like graphite, and therefore, nanoparticles will only be formed on the other electrode. Preferably to only one of the electrodes a cathodic potential is applied, alternating between the chosen potential and a value below the voltage at which the onset of the hydrogen evolution reaction starts. This is also referred to as applying a so-called DC off-set, resulting in that only the electrode to which the cathodic potential is applied remains negative during the entire cycle. This is advantageous because at the cathodic electrode hydrogen will be selectively produced and at the other, anodic, electrode, oxygen will be produced. The hydrogen as produced and optionally in combination with the oxygen as produced can be used as fuel, suitably as fuel to generate electricity in a fuel cell for performing the process according to the present invention. This further improves the efficiency of the present process. The cathodic electrode will be composed of the desired nano-particle metal or alloy. The anodic electrode may be composed of platinum or graphite, which materials will be inert under the anodic conditions.

The nanoparticles as present in the liquid electrolyte are suitably separated from the liquid electrolyte to obtain an end or an intermediate product. Separation can be achieved by many different methods, like precipitation or filtration. Preferably said separation is performed by means of centrifugal force to obtain a phase rich in nanoparticles and a phase of electrolyte. Possible separation processes which use a centrifugal force are a hydrocyclone or a centrifuge. Preferably a centrifuge is used. Suitably the electrolyte is re-used in the process according to the invention as described above. The phase rich in nanoparticles is subsequently diluted with water, preferably deionised water or ultrapure water. In order to redisperse the nanoparticles in the added water it is preferred to apply sonication. Sonification may be performed at conditions known to the skilled person. In order to effectively remove any remaining liquid electrolyte, the steps of centrifugation, dilution with water and sonication can be repeated several times, preferably between 3 and 10 times.

The nanoparticles as obtained may be dissolved to form a suspension in any suitable liquid, suitably water. Surfactants or polymers may be added to achieve a more stable suspension. Examples of suitable surfactants or polymers are Cetyl Trimethyl Ammonium Bromide (CTAB), Tetradecyl Trimethyl Ammonium Bromide (TTAB), surfactants of the Brij® type as obtainable from Sigma-Aldrich and Polyvinylpyrrolidone (PVP). The suspended nanoparticles may be used as an intermediate product suited to transport the nanoparticles from the manufacturer to its end user or as a means to affix the nanoparticle to said support.

For some catalytic end uses of the nanoparticles it is preferred to affix the nanoparticles to the surface of a suitable support. Generally, any support capable of supporting and providing adequate dispersion for the nanoparticles can be used. Preferably, the support is stable in the local environment where the catalyst is to be used. The support has a surface area and/or porosity sufficient to provide dispersion of the nanoparticles. However, a support with increased porosity provides more intimate contact between reactants and catalytic material. Examples of suitable solid supports are silica gels, derivatized plastic films, glass beads, cotton, plastic beads, alumina gels, polymer resins, a zeolite, a molecular sieve, a carbon, an inorganic oxide, an inorganic hydroxide, a mixed inorganic hydroxides or mixed inorganic oxides. Specific examples of these supports are further described in WO-A-2007/055663, which publication is hereby incorporated by reference.

The nanoparticles are preferably fixed to the support by mixing the support with the suspension followed by washing with a solvent to remove the excess of the surfactant. The catalyst may optionally be calcined. Alternatively the nanoparticles can be loaded on a support by first preparing a reverse microemulsion of the nanoparticle as described in WO-A-2008/101602. This publication also describes an alternative support suited for the nanoparticles prepared according to the present invention. The alternative support are fabrics from activated carbon fibers, acrylonitril fibers, glass fibers, ceramic fibers, metal fibers or fleece composite oxides of activated carbon fibers.

The catalyst comprising the nanoparticles as obtained by the present process may be used in various reactions, such as hydrogenation, hydrotreating, hydrocracking, hydroisomerisation, hydrofinishing, reforming, Fischer-Tropsch reactions and methanol to olefin reactions. Suitably the metal or metal alloy comprises a Group VIII metal. The nanoparticles are also suited as catalyst in a fuel cell to catalyse the oxidation of methanol or alternatively ethanol. Methanol and ethanol are particularly attractive as a fuel due to their compatibility with existing infrastructure and its high energy density. The main problem of methanol oxidation on platinum is the formation of poison species (CO) as an intermediate that is difficult to oxidize. Therefore it is desirable to produce platinum nanoparticles with high catalytic activity towards the oxidation of both methanol or ethanol and CO. It has been found that the platinum nanoparticles and platinum alloy particles, especially nanoparticles of PtRh and PtRu, as prepared by the process according to the present invention have improved catalytic activity for the oxidation reaction of methanol and the reduction of nitrate.

It has been also shown that these nanoparticles have improved catalytic activity for the oxidation reaction of CO.

The nanoparticles are also suited as catalyst in a fuel cell to catalyse the oxidation of hydrogen, ethanol, formic acid, ammonia, borohydride and other organic compounds and the reduction of oxygen. Suitably the metal or metal alloy is platinum, copper, gold, rhodium, nickel or a platinum alloy. The nanoparticles are also suited as catalyst for neutralization of exhaust gases from, for example, an automobile engine or industry. Suitably the metal or metal alloy is gold or a platinum alloy. The nanoparticles are also suited as catalyst for waste water treatment for, for example, reduction of nitrates and nitrites. Suitably the metal or metal alloy is gold, platinum, rhodium or a platinum alloy. The nanoparticles can also be used as electrodes in electrochemical sensors in, for example, HPLC. The nanoparticles can also be used in photovoltaics or photocatalysis. Suitably nanoparticles of titanium oxide are used for this application. The nanoparticles may also find use as part of a conductive nano ink. Suitably gold, silver or copper nanoparticles are used for this application.

Nanoparticles comprising silver as prepared according to the present invention may advantageously find use as part of an anti-microbial device or composition, for example as part of wound dressing, clothing, filters, cloth, ointment or paint.

The invention also relates to nano lead-free soldering paste used for electronic element welding and surface packaging. Soldering is an indispensable technology used for the interconnection and packaging of electronic products. For the last decades, Sn—Pb solder alloys have been the preferred interconnection materials used in such applications. This preference can be attributed to their numerous advantages, such as low cost, low melting temperature, good workability and ductility, excellent mechanical properties, and good soldering and wetting behaviour on several substrate materials such as Cu, Ag, Pd, Au, and respective alloys. Increased environmental and health concerns regarding the toxicity of Pb have, however, lead many countries to legislate the ban of Pb from many electronic applications. It is therefore of utmost importance for the electronics community to find appropriate substitutes to replace Sn—Pb solders. The nano lead-free soldering paste has the advantage over non-nano soldering paste in that the melting point of the nano lead-free soldering paste is lower. This is obviously advantageous for soldering applications. Known methods to prepare nanoparticles for such a soldering paste are described in Journal of Electronic Materials, Vol. 38, No. 2, 2009 pages 351-355. In this publication it is mentioned that the Sn-2.62Ag-0.34Cu nanoparticles are prepared by a so-called consumable-electrode direct current arc technique resulting in a particle size ranging between 10 and 100 nm. Applicants now found that with the process according to the present invention nanoparticles are prepared having the smaller size and having much narrower size distribution. Thus the majority of the particles have a smaller size resulting in an even more improved lowering of the melting point.

The nano lead-free soldering paste consists of nano lead-free solder powder and soldering flux, and according to the mass percent, the nano lead-free soldering paste contains the following components: 85 to 94 weight percent of nano particles and 6 to 15 weight percent of soldering flux, wherein, the nano particles are preferably nanoparticles prepared by the process according to the present invention wherein the starting solid metal object is made of an alloy comprising Sn and at least one other metal. A preferred other metal is Ag. Possible alloys are Sn—Ag, Sn—Ag—Cu, Sn—Bi, Sn—Zn, Sn—Zn—Bi, Sn—Co—Cu, Sn—Cu, Sn—In, or Sn—Sb and wherein the nanoparticles thus obtained are composed of the starting alloy. A preferred alloy is SnAg, wherein the content of Ag in the alloy is preferably between 2 and 5 wt %. An example is 96.5Sn-3.5Ag (weight ratio). Another suitable alloy is SnAgCu alloy wherein the content of Ag may vary from 2 to 5 wt % and the content of Cu may vary from 0.1 to 1.5 wt %. An example is Sn-3 Ag-0.5 Cu (wherein the values are weight percentage).

The invention will be illustrated with the following non-limiting examples

Example 1

Figure 2:
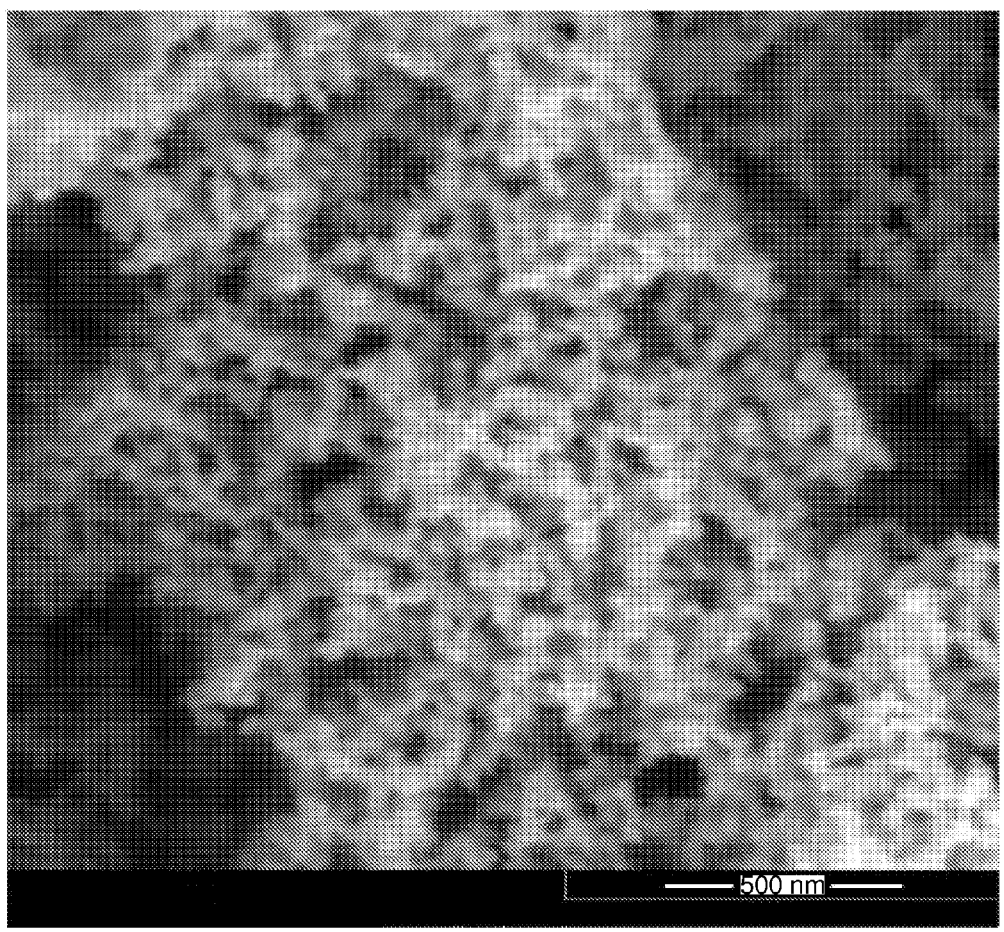
FIG. 2 is a high-magnification SEM image of FIG. 1 of formation of nanoparticles having a size of <50 nm which were coated on the surface of the platinum wire (bar=500 nm scale.

A 100 µm diameter platinum wire having a purity of 99.99 wt % was submerged by 1 mm in an aqueous solution containing 10 M NaOH. Said solution was prepared with ultrapure water (Millipore MilliQ gradient A10 system, 18.2 MΩ cm, 3 ppb total organic carbon) and NaOH (99.9% from Sigma-Aldrich). For 1000 seconds a cathodic potential of −10 V dc (direct current) was maintained. Vitreous carbon is used as anode to rule out the possibility of formation of interfering species by anode dissolution. The platinum wire was rinsed with ultrapure water and observed using SEM (scanning electron microscope). The SEM images as shown in FIGS. 1 and 2 showed the formation of nanoparticles having a size of <50 nm which were coated on the surface of the platinum wire. It was observed that even the vigorous $H_2$ gas evolution during the cathodic treatment was not able to dislodge the particles from the surface.

Example 1a and 1b

Example 1 was repeated except that the metal was Ir or Re. The cathodic potential was −30 V (dc) and the electrolyte was an aqueous solution of 1 M $NaClO_4$. The solution of $NaClO_4$ was prepared from $NaClO_4$ 99.9% from Sigma-Aldrich. The experiment was continued for 30 minutes. Inspection of the cathodes, after that the electrolyte was removed by washing with deionised water, showed that the surface of the Ir and Re cathode was coated with nanoparticles of Ir and Re respectively.

Example 2

Figure 3:
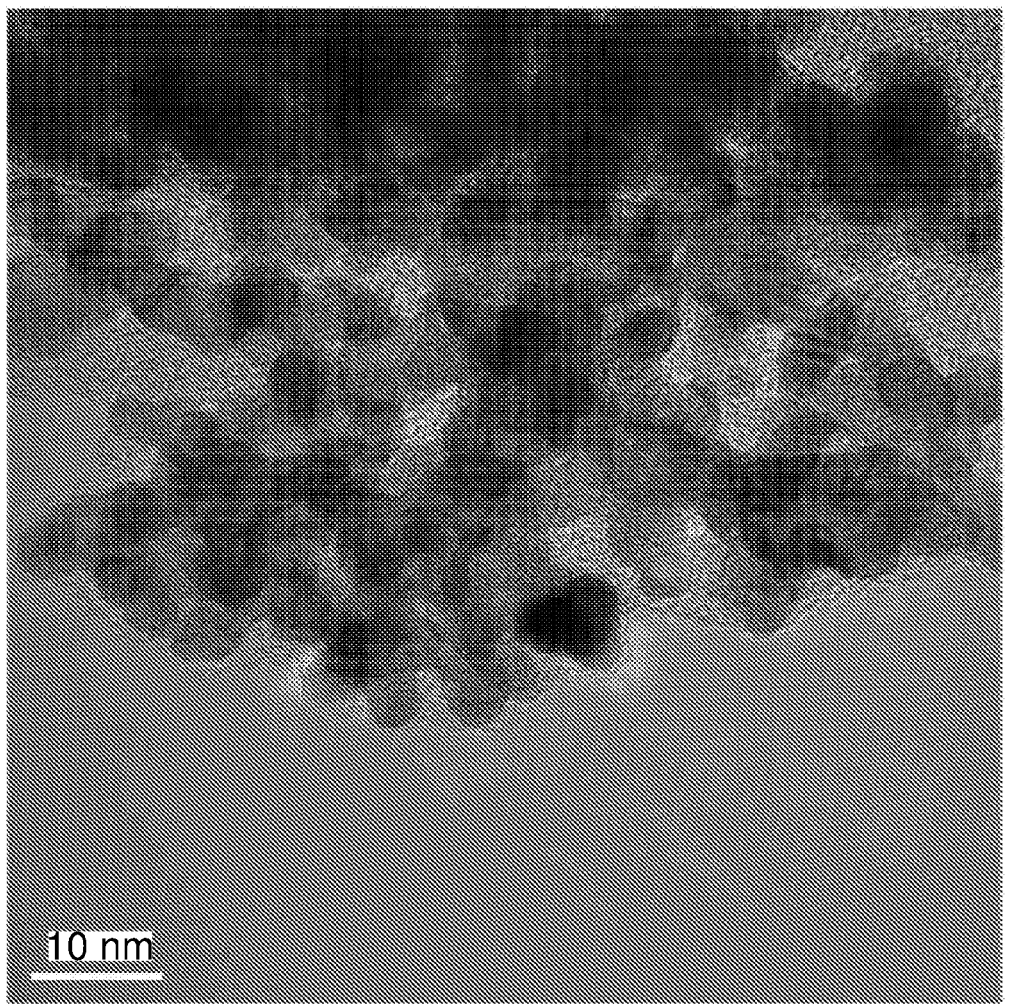
FIG. 3 is a transmission electron microscope (TEM) image showing that platinum nanoparticles formed having a size ranging from 4 to 30 nm when a platinum wire was used.
Figure 4:
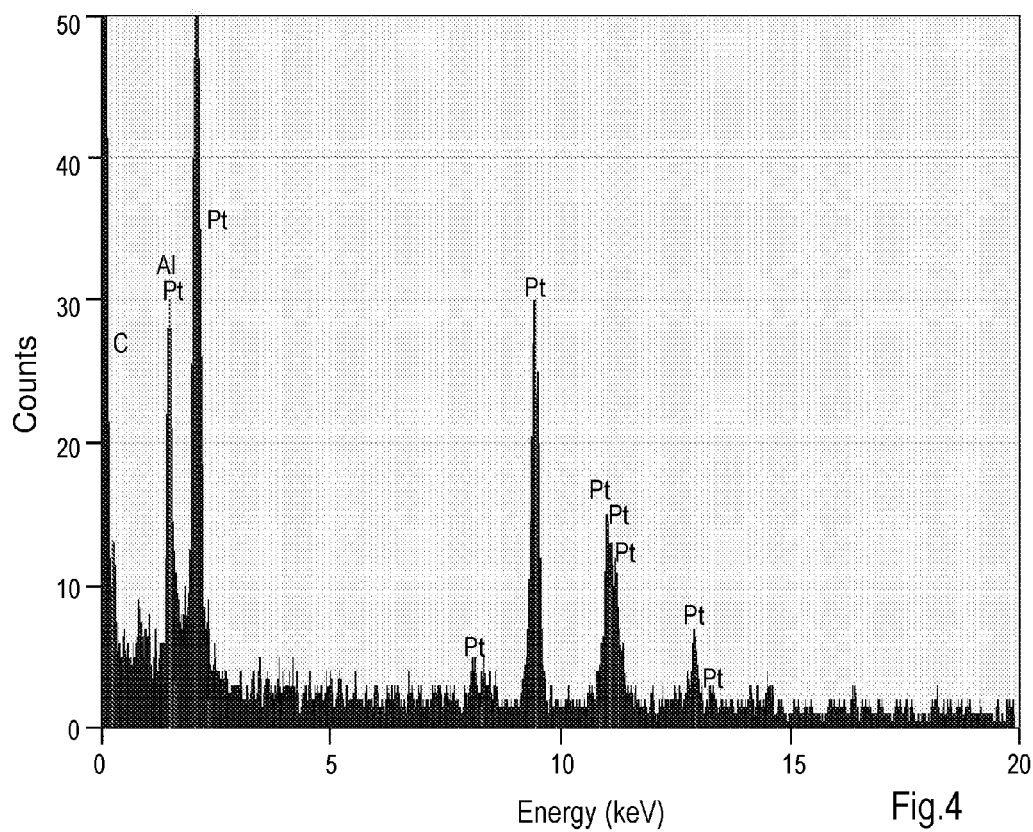
FIG. 4 shows an Energy Dispersive X-ray (EDX) spectrum of the platinum nanoparticles showing that lattice spacing, as well as Energy Dispersive X-ray (EDX) spectrum measured correspond exactly to platinum.

Example 1 was repeated except that an alternating current at 100 Hz and 20 V peak to peak (p-p) square wave ac was applied in 10 M NaOH. After around 100 seconds the platinum wire part as submerged in the liquid electrolyte was totally 'dissolved'. The aqueous solution had turned black, and consists of a suspension of nanoparticles. The electrolyte in the nanoparticles solution was subsequently removed by successive steps of centrifugation at 3000 rpm using a Hettich EBA 20 Centrifuge), dilution with ultrapure water and sonication in an ultrasonic bath at 40 kHz using a Branson ultrasonic cleaner Model 2510. The cleaned suspension of nanoparticles was deposited on a grid for further investigation using a transmission electron microscope (TEM). It was found that platinum nanoparticles had formed having a size ranging from 4 to 30 nm. Lattice spacing as well as Energy Dispersive X-ray (EDX) spectrum measured correspond exactly to platinum. FIG. 3 shows the TEM image. FIG. 4 shows the EDX spectrum.

Comparative Experiment A

Example 1 and 2 was repeated, except that instead of an aqueous solution containing NaOH, an aqueous acid solution of $H_2SO_4$, $HClO_4$ or HCl was used, with concentration between 1 M and 10 M. Under the remaining conditions of Example 1 and 2 no formation of metal nanoparticles was observed.

Example 3

Figure 5:
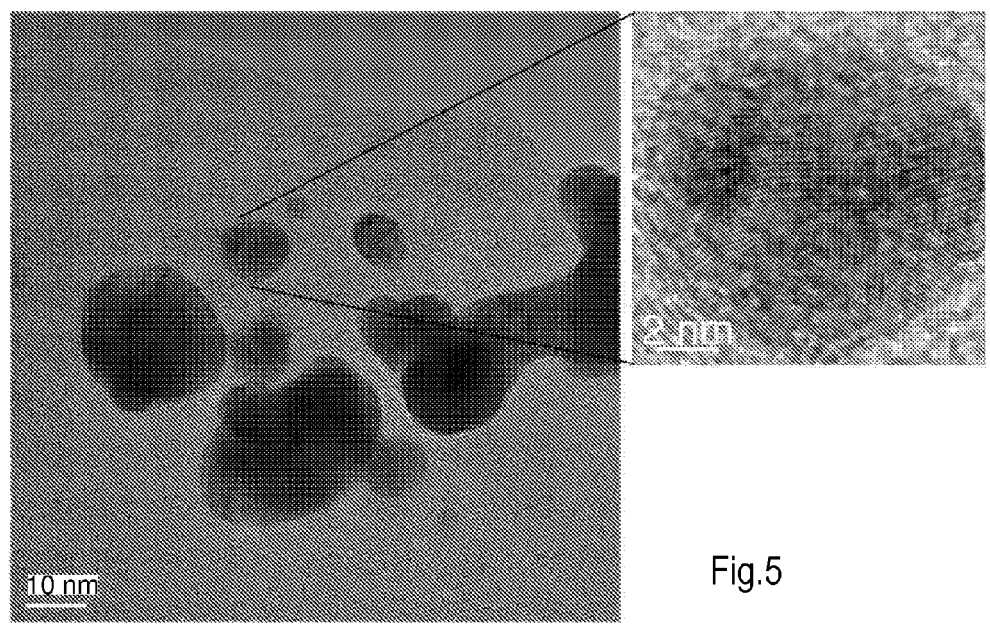
FIG. 5 showed transmission electron microscope (TEM) image showing gold nanoparticles formed having a size ranging from 4 to 30 nm when a gold wire was used.
Figure 6:
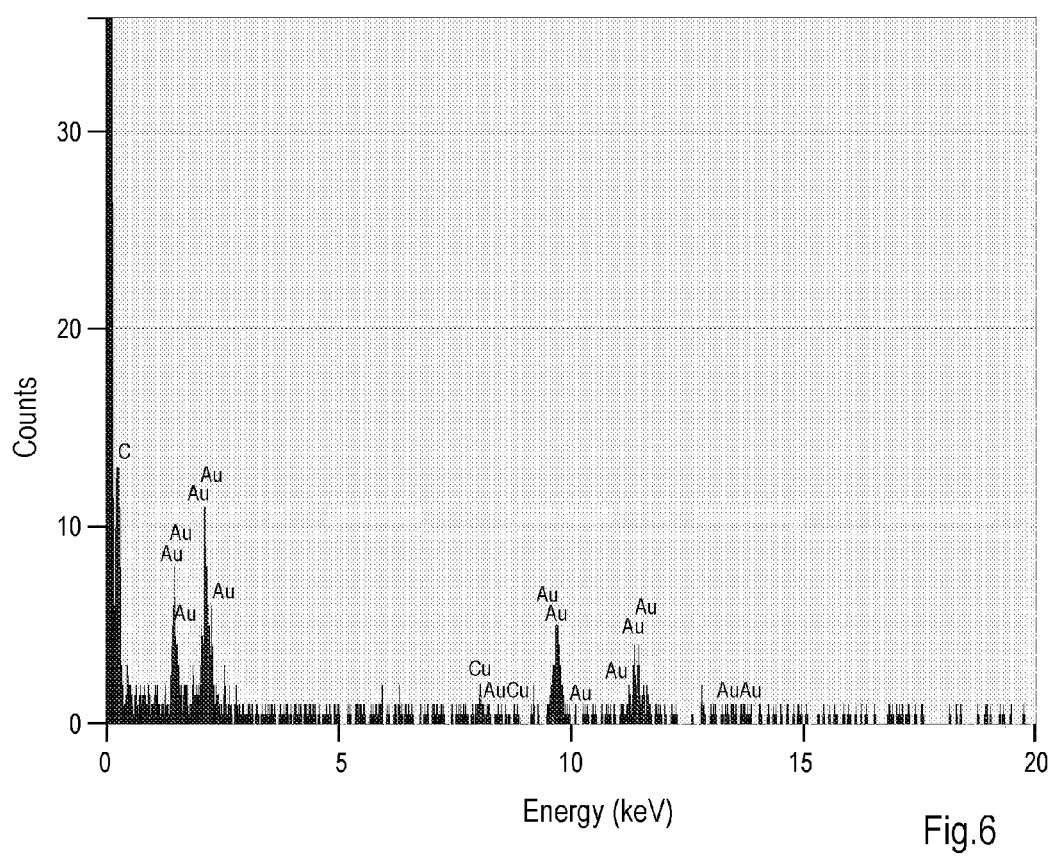
FIG. 6 shows an Energy Dispersive X-ray (EDX) spectrum of the gold nanoparticles showing that lattice spacing, as well as Energy Dispersive X-ray (EDX) spectrum measured correspond exactly to gold.

Example 2 was repeated using a gold wire instead of the platinum wire. In this way, a solution with gold nanoparticles is obtained, which was cleaned as described in example 2. After further investigation of said solution using a transmission electron microscope (TEM) it was found that gold nanoparticles had formed having a size ranging from 4 to 30 nm. Lattice spacing as well as EDX spectrum measured correspond exactly to gold. FIG. 5 shows the TEM image. FIG. 6 shows the EDX spectrum.

Examples 4

Example 2 was repeated wherein the following aqueous electrolyte compositions were used: 10 M NaOH, 1 M NaOH, 1 M tetra-tert-butylammonium hydroxide, 1 M LiOH, 1 M CsOH, 1 M KOH, 1 M $NH_4Cl$, 1 M NaCl, 1 M $NaClO_4$, 0.5 M $K_3PO_4$, 0.5 M $BaCl_2$, 1 M $NH_4F$, 1 M $Na_2SO_4$, 1 M $NaNO_3$, 1 M $H_3BO_3$+1 M $NaH_2BO_3$ and 1 M NaF. In all examples the formation of platinum nanoparticles in the solution was observed.

Example 5

Example 2 was repeated wherein the following aqueous electrolyte composition was used: 10 M NaOH. The voltage was varied according to the following list: 28 V p-p, 24 V p-p, 16 V p-p, 12 V p-p, 8 V p-p, 4 V p-p. For all voltages the formation of platinum nanoparticles in solution was observed.

Examples 6

Example 2 was repeated wherein the following electrolyte composition was used: 10 M NaOH and wherein the metal was varied: Ni, Rh, Ag, Nb, Al, Co, Mo, Y, V, and Ru. The formation of nanoparticles in the solution was observed for all metals. In case of ruthenium a ruthenium oxide nanoparticle was isolated from the solution.

Examples 7

Example 2 was repeated wherein the following electrolyte composition was used: 1 M NaOH and wherein the metal was Cu, V, In, Rh and Mn. The formation of nanoparticles of said metals in the solution was observed.

Example 8

Example 6 was repeated except that the metal was Au and the voltage was 30 V p-p. The formation of gold nanoparticles in the solution was observed.

Example 9

Example 2 was repeated except that the electrolyte was molten NaOH. The formation of platinum nanoparticles was observed.

Example 10

Example 9 was repeated at 10 V p-p alternating current. The formation of platinum nanoparticles was observed.

Examples 11

Example 7 was repeated wherein the following metal alloys were used as cathode: $Pt_{90}Rh_{10}$, $Pt_{90}Rh_{20}$, $Pt_{70}Rh_{30}$, $Pt_{80}Ir_{20}$, $Pt_{50}Ni_{50}$, $Pt_{952}Ru_{48}$, wherein the subindexes in the alloys refer to the weight percentage. For all alloys the formation of nanoparticles was observed. The applicants have found that these nanoparticles exhibit an electrochemical behaviour in sulfuric acid solutions that clearly indicates that the nanoparticles are not a mixture of Pt nanoparticles and the other metal nanoparticles. Consequently, the chemical composition of the synthesized nanoparticles must be that of an alloy.

Example 12

Example 11 was repeated for all alloys using a 10 M NaOH electrolyte solution. For all alloys the formation of alloy nanoparticles was observed as in Example 11.

Examples 13

Example 2 was repeated at different frequencies of the alternating current: 10 Hz, 50 Hz, 100 Hz, 500 Hz, 1000 Hz and 10000 Hz. At all frequencies the formation of platinum nanoparticles was observed.

Example 14

Figure 7:
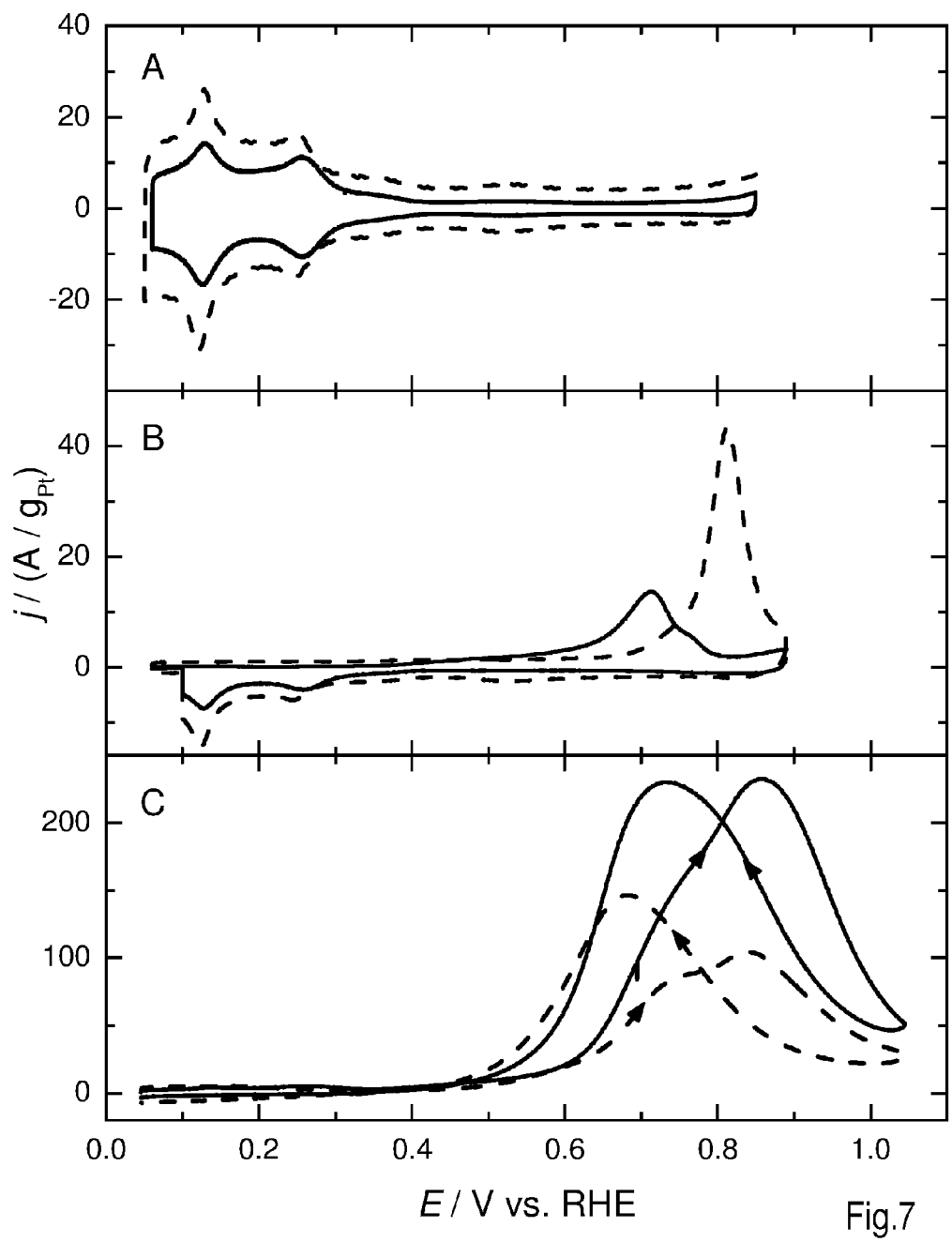
FIGS. 7A-7C show results of the platinum-nanoparticles modified using gold electrodes (solid lines) versus commercially obtained nanoparticles (dashed line).

The solution of platinum nanoparticles as obtained in Example 2 was subjected to a centrifuge at 3000 rpm to separate the majority of the electrolyte from the nanoparticles. The remaining concentrated nanoparticles solution was diluted with ultrapure water and redispersed by sonication in an ultrasonic bath at 40 kHz. The steps of centrifugation, dilution with water and sonication were repeated six times. At the end, the nanoparticle solution had pH=7 and the concentration was of 1 mgram of Pt in 1 ml of solution. 3 μl of said solution was deposited on a flat gold electrode having a diameter of 3 mm. The water content of the nanoparticle solution was dried under a flux of argon. The thus deposited platinum nanoparticles remain attached to the gold surface during the following electrochemical experiments. The platinum-nanoparticles-modified gold electrode was transferred to an electrochemical cell. The blank voltammogram was recorded in 0.5 M $H_2SO_4$ at a scan rate of 50 mV/s (FIG. 7A, solid curve). Then, the electrooxidation of CO was measured after adsorption of CO at E=0.1 V vs. RHE (RHE=Reversible Hydrogen Electrode) for 1 minute and consequent purging with of the CO dissolved in solution for 30 minutes. The CO electrooxidation was recorded with a scan rate of 20 mV/s. The results are shown in FIG. 7B, solid curve. Then, the catalysis for methanol oxidation was measured in a 0.5 M $H_2SO_4$+0.5 M $CH_3OH$ solution at a scan rate of 50 mV/s (FIG. 7C, solid curve). Current was normalized per gram of platinum.

Comparative Experiment B

Example 5 is repeated using commercially obtained nanoparticles from the Tanaka Kikinzoku Inc company. The as-received nanoparticles were dispersed on Vulcan® carbon with 50% wt loading, and had an average size of 5 nm diameter. A solution of 1 mgram of Pt in 1 ml of solution was obtained by adding ultrapure water. Dispersion of the nanoparticles in solution was achieved by sonication for one hour. Afterwards, 3 µl of said solution was deposited on a glassy carbon electrode having a diameter of 3 mm as in Example 14. The water content of the nanoparticle solution was dried under a flux of argon. The thus deposited platinum nanoparticles remain attached to the glassy carbon surface during the following electrochemical experiments. The platinum-nanoparticles-modified glassy carbon electrode was transferred to an electrochemical cell. Further cleaning of the nanoparticles is achieved by cycling the electrode between 0.05 V and 1.1 V vs. RHE for 80 cycles in 0.5 M $H_2SO_4$ at 50 mV/s. Afterwards, the electrode was transferred to a new electrochemical cell, and the blank voltammogram was recorded in 0.5 M $H_2SO_4$ at a scan rate of 50 mV/s (FIG. 7A, dashed curve). Then, CO and methanol electrooxidation were recorded as described in example 5. The results are shown in FIGS. 7B and 7C, dashed curves.

FIG. 7B clearly shows that CO oxidation takes place at ca 0.1 V lower overpotential in Example 14 as compared to the results of Experiment B. Further the charge under the CO stripping peak is about two times lower for Example 14. The first observation shows that it is energetically more favourable to oxidize CO with the catalyst comprising the platinum nanoparticles as obtained by the present invention. The second observation indicates that our nanoparticles are ~1.5 times larger on average, which leads to a lower effective surface area per gram of platinum.

FIG. 7C shows that the current towards methanol oxidation is markedly higher in Example 14 (solid line) than in the comparative experiment B (dashed line). Although the nanoparticles of Example 14 are ~1.5 times larger on average than the ones used in Experiment B (which leads to a lower effective surface area per gram of platinum) it is nevertheless observed that the intrinsic catalytic activity of the nanoparticles of Example 14 overcompensates for this effect in such a way that the maximum methanol oxidation current is double that of Experiment B using the commercial nanoparticles. Thus it is concluded that the platinum nanoparticles as prepared according to this invention are catalytically more active than the existing platinum nanoparticles of Experiment B.

Example 14

The cathodic corrosion method described here is a simple, clean and fast way of synthesis of nanoalloys with high catalytic performance. On the example of a series of PtRh alloys we show that this one-step method can convert a bulk alloy electrode into an aqueous suspension of nanoparticles, retaining the composition and the crystal lattice structure of the starting alloy. Compared to pure metals, these alloy nanocatalysts are more active towards the CO and methanol oxidation and the nitrate reduction reactions. Nanoparticles made of PtRu, PtIr, PtNi, AuCo, AuCu and FeCo bulk alloys demonstrate the universality of this synthesis method.

Figure 8:
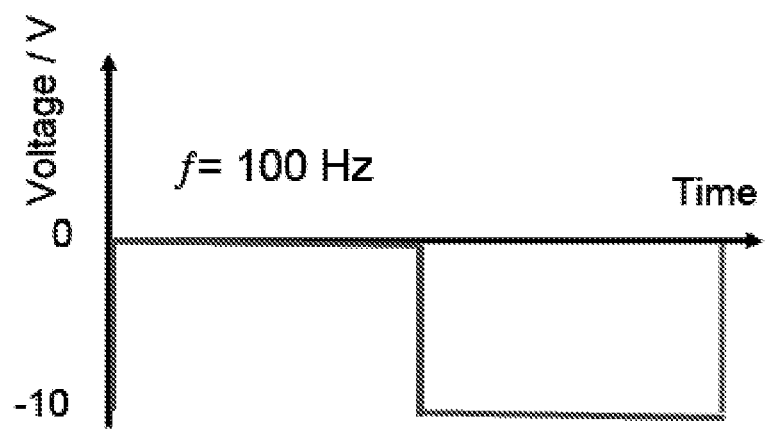
FIG. 8 shows the negative dc offset results in the formation of the nanoparticles via a reduction (cathodic) process at the alloy wire electrode. In the case of the alloys PtRh, PtRu, PtIr, AuCo, AuCu and FeCo, the applied ac potential varied between −10 and 0 V vs. the glassy carbon counter electrode.

An alloy wire having a diameter of 0.12 mm was immersed for 2.5 mm in an electrolyte. In the case of the alloys PtRh, PtRu, PtIr, AuCo, AuCu and FeCo, the electrolyte was 1 M NaOH. In the case of alloys PtNi and PtCo, the electrolyte was a saturated solution of $H_2SO_4$. An ac potential versus a high surface area glassy carbon counter electrode was applied, until all submerged metal is converted into a black suspension of metal nanoparticles. A negative dc offset ensures that the formation of the nanoparticles proceeds via a reduction (cathodic) process at the alloy wire electrode. In the case of the alloys PtRh, PtRu, PtIr, AuCo, AuCu and FeCo, the applied ac potential varied between −10 and 0 V vs. the glassy carbon counter electrode (see FIG. 8). In the case of the alloy PtNi, the applied ac potential varied between −4 and +1 V vs. the glassy carbon counter electrode. In the case of the alloy PtCo, the applied ac potential varied between −5 and +2 V vs. the glassy carbon counter electrode. A black suspension coming off the electrode was observed throughout the experiment. Once the wire is atomized, the suspension of nanoparticles is centrifuged and washed with MilliQ water.

Figure 9:
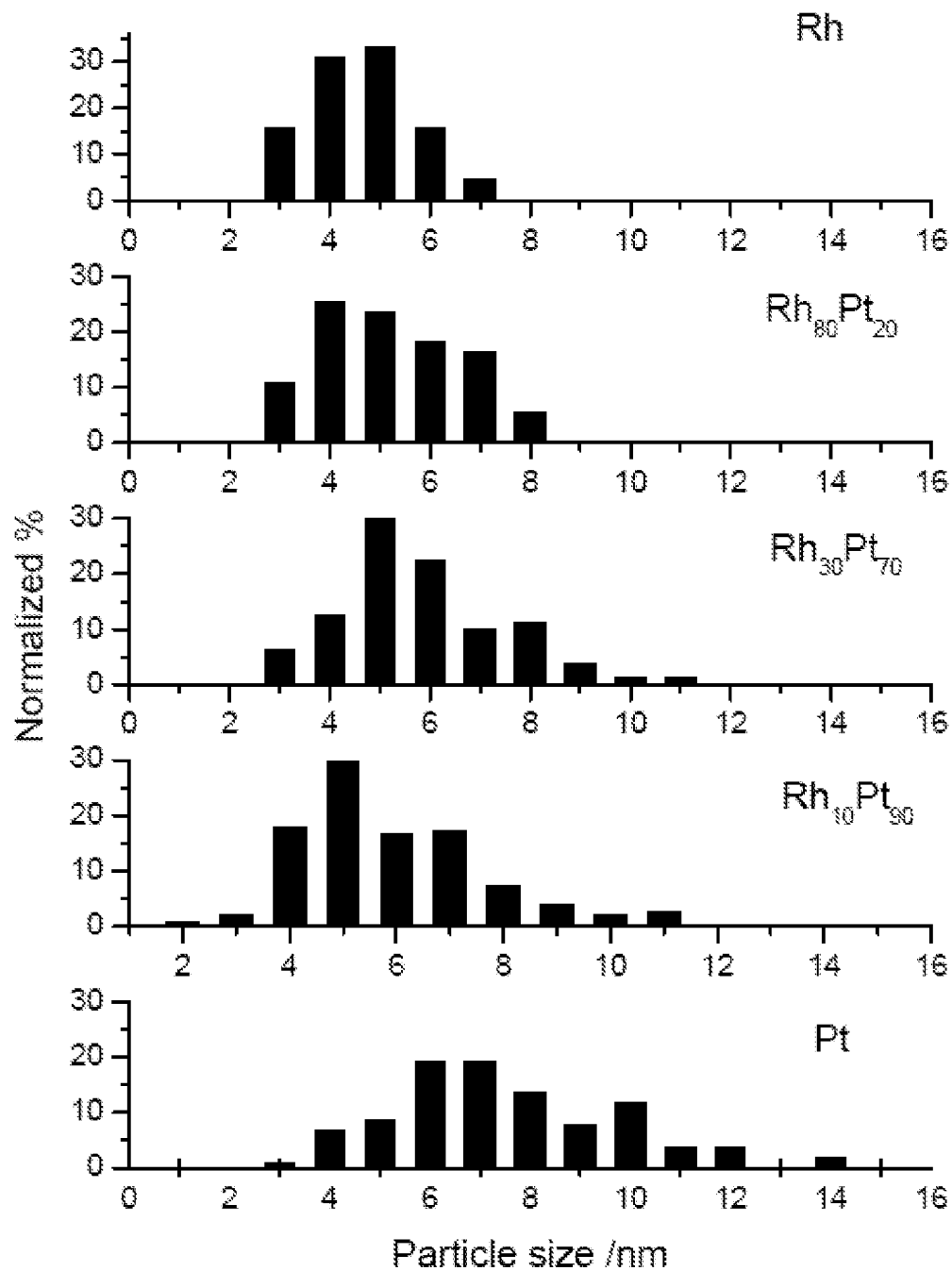
FIG. 9 shows particle size of the nanoparticles as assessed by transmission electron microscopy (TEM), including energy dispersive x-ray analysis (EDX), and x-ray diffraction (XRD) for Rh, Rh80Pt70, Rh30Rt70, Rh10, Rt90 and Pt.

After cathodic atomization the nanoparticles were characterized by transmission electron microscopy (TEM), including energy dispersive x-ray analysis (EDX), and x-ray diffraction (XRD). As is expected for clean, unprotected nanoparticles, they show a certain degree of agglomeration, while careful visual size analysis gives a rather compact size distribution (see FIG. 9). EDX composition analysis confirms within a 5% error that the composition of the nanoparticles remains the same as the starting wire material.

Example 15

The electrochemical properties of the PtRh nanoparticles prepared in Example 14 were measured by recording a current-voltage characteristic of an electrochemical interface under controlled conditions (a so-called blank voltammogram). The nanoparticles were supported on a gold electrode in sulfuric acid. It is well known that the voltammetric response of gold in this media does not show any significant signal in the potential region under study. Prior to each experiment, the blank voltammogram of the bare gold was checked in order to avoid contamination from previous samples. Two important potential regions were identified. The features between 0.05 V and 0.4 V are related to the adsorption/desorption of a monolayer of hydrogen and anions, and between 0.4 and 0.9 V to the adsorption/desorption of OH species on Rh.

It was found that as the content of Rh is increased in the alloy, in the lower potential region the two peaks of hydrogen shift toward more negative potentials, becoming one single peak characteristic of Rh. In the higher potential region the charge related to the adsorption/desorption of OH increases with the concentration of Rh in the sample.

The electrochemical oxidation of methanol on bimetallic catalysts is an important and widely studied reaction due to applications in low temperature fuel cells, with a number of studies on PtRh alloys. As for the reduction of nitrate, Rh is generally considered to be most active monometallic electrocatalyst. Remarkably little attention has been given to PtRh alloys for this reaction.

Two important behaviours were found:

1) The maximum negative current corresponding to the reduction of nitrate increases proportionally to the content of Rh, but surprisingly the $Rh_{80}Pt_{20}$ nanoalloy exhibits an even higher current density than pure Rh nanoparticles, also when compared in terms of current density per electrochemically active surface area. The maximum current density observed in the sample $Rh_{80}Pt_{20}$ is 560 µAcm$^{-2}$ while the maximum current density observed in the pure Rh sample for the same concentration for nitrate is 400 µAcm$^{-2}$. Previous results for Rh nanoparticles and Rh massive electrode report maximum currents of 500 µAcm$^{-2}$ (in a 10 times more concentrated solution) and 300 µAcm$^{-2}$.

2). The $Rh_{80}Pt_{20}$ sample also exhibits a smaller difference between the reduction current in the negative and the positive scans, suggesting that the reactivity of intermediate species (nitrite, NO) leads to less hysteresis compared to the other samples. While Rh is generally considered the best monometallic catalyst for nitrate reduction, the observation that our $Rh_{80}Pt_{20}$ nanoparticles are superior to pure Rh is new and significant. The high activity of Rh is usually ascribed to its ability to strongly bind (oxy-)anions.

In the voltametric response of the supported nanoparticles towards the oxidation of methanol it was found that the samples of Rh and $Rh_{80}Pt_{20}$ show no (or negligible) activity towards the oxidation of methanol in agreement with previous results on bulk electrodes. This is due to the inhibition of methanol adsorption by the strong adsorption of poisoning CO on Rh. The samples with higher platinum content, however, show significant oxidation currents in the potential region between 0.4 and 0.9 V. The voltammetric profiles of the three high content platinum samples show very similar behaviour, the most important characteristic being the hysteresis between the positive and the negative scan. The lower oxidation currents during the positive scan are due to the initial CO poisoning of the surface. At higher potentials this CO is oxidized off the surface, and during the negative scan the oxidation of methanol is not limited by the presence or formation of the poison and for that reason the currents are higher. The alloys $Pt_{90}Rh_{10}$ and $Pt_{70}Rh_{30}$ present a hysteresis of about 60 mV between the positive and the negative scan, which is 40 mV smaller than the hysteresis of the Pt sample. This is probably due to the higher reactivity of these alloys toward the oxidation of surface-poisoning CO. It is therefore clear that, compared to pure metals; PtRh alloys show better catalytic activity for the oxidation of methanol and CO, which are reactions of special interest for fuel cells and, in the gas phase, for automotive exhaust catalysis.

Example 16

To demonstrate the universality of our cathodic atomization method, we have prepared nanoparticles from $Pt_{80}Ir_{20}$, $Pt_{95}Ru_5$ and $Pt_{50}Ni_{50}$ alloy wires, and also AuCo, AuCu and FeCo alloys in a method as described in Example 14. In all cases TEM analysis shows nanoparticles with a mean size below 10 nm, EDX confirms the bimetallic composition, and the shift of x-ray diffraction lines indicates proper alloying. Electrochemical studies of CO and methanol oxidation on PtRu nanoalloys, and the oxygen reduction reaction on PtNi nanoalloys, as prepared by

The invention claimed is:

1. A process to prepare metal nanoparticles or metal oxide nanoparticles by applying a cathodic potential as an alternating current (ac) voltage to a solid starting metal object, wherein the solid metal object is in contact with a liquid electrolyte comprising a stabilising cation, wherein the applied voltage is between 0.1 V and 30 V more cathodic than the onset of the hydrogen evolution reaction, wherein two electrodes are in contact with the liquid electrolyte and wherein one electrode is composed of the solid starting metal and wherein only to that electrode is a cathodic potential applied.

2. The process according to claim 1, wherein the liquid electrolyte comprises water.

3. The process according to claim 1, wherein the metal or metals of the solid metal object are chosen from the groups of the Periodic Table of Elements according to IUPAC starting at 3 to and including group 15.

4. The process according to claim 3, wherein the metal of the solid metal object is chosen from the group consisting of Y, Ti, V, Mn, Fe, Co, Ni, Cu, Zn, Zr, Nb, Mo, Ru, Ag, Ta, W, Re, Os, Ir, Pt, Au, Al, Si, Ga, Ge, As, In, Sn, Sb, Te, Tl, Pb and Bi.

5. The process according to claim 1, wherein the solid starting metal is an alloy of two or more metals.

6. The process according to claim 5, wherein the alloy is chosen from the group consisting of PtNi, PtIr, PtRh, PtRu, PtCo, PtMo, PtAu, PtAg, PtRuMo, PtFe, AuCu, PtCu, PtOs, PtSn, PtBi, CuNi, CoNi, AgCu, AgAu, NiSn and SnAg, SnAgCu.

7. The process according to claim 6, wherein the alloy is a SnAg or SnAgCu alloy.

8. The process according to claim 1, wherein the stabilising cation is an alkali, alkaline earth, ammonium or an alkyl ammonium cation.

9. The process according to claim 1, wherein the nanoparticles are separated from the liquid electrolyte.

* * * * *